United States Patent
Alshehri (10) Patent No.: US 11,739,879 B2
(45) Date of Patent: Aug. 29, 2023

(54) PLUGGING PINHOLE LEAKS IN FLOWLINES

(71) Applicant: Saudi Arabian Oil Company, Dhahran (SA)

(72) Inventor: Ayedh Meshref Alshehri, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/543,280

(22) Filed: Dec. 6, 2021

(65) Prior Publication Data

US 2023/0175629 A1 Jun. 8, 2023

(51) Int. Cl.
*F16L 55/16* (2006.01)
*F16L 55/168* (2006.01)

(52) U.S. Cl.
CPC ......... *F16L 55/1612* (2013.01); *F16L 55/168* (2013.01)

(58) Field of Classification Search
CPC ............................ F16L 55/1612; F16L 55/168
USPC ...................................................... 138/99, 97
See application file for complete search history.

(56) References Cited

U.S. PATENT DOCUMENTS

| | | | | |
|---|---|---|---|---|
| 969,355 A * | 9/1910 | Ferman | .................... | F16L 41/06 408/111 |
| 1,156,890 A * | 10/1915 | Crow | .................... | F16L 55/163 138/97 |
| 2,182,258 A * | 12/1939 | Kirk | ..................... | F16L 55/1705 138/99 |
| 2,377,643 A * | 6/1945 | Nelson | ................ | F16L 55/1705 138/97 |
| 2,655,946 A * | 10/1953 | Morris | ...................... | F16K 1/04 138/99 |
| 3,053,282 A * | 9/1962 | Fox | ..................... | F16L 55/1705 114/227 |
| 3,905,396 A * | 9/1975 | Peterson | ................. | F16L 55/18 138/90 |
| 4,209,029 A | 6/1980 | Pennington | | |
| 5,313,986 A * | 5/1994 | Jude | ......................... | F16L 1/26 414/782 |
| 8,015,695 B2 | 9/2011 | Polivka et al. | | |
| 2003/0037830 A1 | 2/2003 | Lee | | |

* cited by examiner

*Primary Examiner* — James F Hook
(74) *Attorney, Agent, or Firm* — Fish & Richardson P.C.

(57) ABSTRACT

An assembly to plug a leak in a flowline includes a plug configured to plug the leak in the flowline, which includes a circumferential surface and a longitudinal axis. A plug insertion subassembly supports the plug. The plug insertion subassembly can move the plug between the circumferential surface and the longitudinal axis of the flowline. An axial positioning subassembly supports the plug insertion subassembly. The axial positioning subassembly can move the plug insertion subassembly along the longitudinal axis of the flowline. A chain-operated rotational positioning subassembly supports the axial positioning subassembly. The rotational positioning subassembly can be attached to the flowline with the leak. The rotational positioning subassembly is movable and can move the axial positioning subassembly on the circumferential surface of the flowline.

17 Claims, 6 Drawing Sheets

PLUGGING PINHOLE LEAKS IN FLOWLINES

TECHNICAL FIELD

This disclosure relates to managing fluid flow through flowlines, for example, managing the flow of hydrocarbons flowed through flowlines.

BACKGROUND

Hydrocarbons (for example, petroleum, natural gas, or combinations of them) or other fluids can be carried over distances through flowlines (or pipelines). A flowline is a hollow elongated tubular. Fluids can be flowed under pressure (for example, pumped) from one location to another, sometimes over several hundred or thousand kilometers or miles. Sometimes, a flowline can spring a leak on its circumferential surface. The leak can be caused due to mechanical reasons, for example, impact on the outside of the flowline; or due to chemical reasons, for example, corrosion caused by the chemical nature of the fluids being flowed in the flowline. The leak causes fluid loss as the fluid flows out of the flowline through the leak. The leak also causes a pressure drop within the flowline. An untreated leak can grow over time. In some instances, a small-sized leak (often called a pinhole leak) can be plugged by inserting an appropriate plug material into the leak from the outside of the flowline.

SUMMARY

This disclosure describes plugging pinhole leaks in flowlines.

Certain aspects of the subject matter described here can be implemented as an assembly to plug a leak in a flowline. The assembly includes a plug configured to plug the leak in the flowline, which includes a circumferential surface and a longitudinal axis. A plug insertion subassembly supports the plug. The plug insertion subassembly can move the plug between the circumferential surface and the longitudinal axis of the flowline. An axial positioning subassembly supports the plug insertion subassembly. The axial positioning subassembly can move the plug insertion subassembly along the longitudinal axis of the flowline. A chain-operated rotational positioning subassembly supports the axial positioning subassembly. The rotational positioning subassembly can be attached to the flowline with the leak. The rotational positioning subassembly is movable and can move the axial positioning subassembly on the circumferential surface of the flowline.

An aspect combinable with any other aspect includes the following features. The chain-operated rotational positioning subassembly includes a body. Multiple wheels are supported by the body. The wheels contact the circumferential surface of the flowline and can rotate to move the rotational positioning subassembly on the circumferential surface of the flowline. A chain is supported by the body. The chain can be wrapped around the flowline. The chain retains the chain-operated rotational positioning subassembly against the circumferential surface of the flowline. A control wheel is supported by the body. The control wheel is connected to the chain and to the wheels. A rotation of the control wheel causes a translation of the chain, which causes the wheels to rotate on the circumferential surface of the flowline.

An aspect combinable with any other aspect includes the following features. The chain-operated rotational positioning subassembly includes a chain holder that includes a lock connected to the chain. When the lock is in a locked position, the chain holder can lock a rotation of the rotational positioning subassembly on the circumferential surface of the flowline. When the lock is in an unlocked position, the chain holder can permit free rotation of the rotational positioning subassembly on the circumferential surface of the flowline.

An aspect combinable with any other aspect includes the following features. The chain holder includes a spring that can be compressed when the lock is in the locked position and can be decompressed when the lock is in the unlocked position.

An aspect combinable with any other aspect includes the following features. The control wheel of the rotational positioning subassembly includes a handle attached to a circumference of the control wheel.

An aspect combinable with any other aspect includes the following features. The axial positioning subassembly includes two arms—a first arm and a second arm. The first arm includes a first end connected to the rotational positioning subassembly and a second end opposite the first end. The second arm includes a third end connected to the rotational positioning subassembly and a fourth end opposite the third end. A plate connects the second end of the first arm and the fourth end of the second arm.

An aspect combinable with any other aspect includes the following features. The axial positioning subassembly includes a first attachment sleeve supported by the first arm. A second attachment sleeve is supported by the second arm. The plug insertion subassembly is supported by and connected to the first attachment sleeve and the second attachment sleeve.

An aspect combinable with any other aspect includes the following features. The first attachment sleeve defines a hollow portion through which the first arm passes. The second attachment sleeve defines a hollow portion through which the second arm passes. The axial positioning subassembly includes a plate connecting the first attachment sleeve and the second attachment sleeve. The plug insertion subassembly is carried by the plate connecting the first attachment sleeve and the second attachment sleeve.

An aspect combinable with any other aspect includes the following features. The plug insertion subassembly includes a plugger body attached to and resting on the plate connecting the first attachment sleeve and the second attachment sleeve. A thread shaft includes an end which is attached to the plugger body and which extends radially away from the flowline. A control wheel is attached to another end of the threaded shaft. The control wheel can be rotated to move the plug between the circumferential surface and the longitudinal axis of the flowline.

An aspect combinable with any other aspect includes the following features. The threaded shaft is attached to a first surface of the plugger body. The plug is attached to the plugger body on a second surface opposite the first surface.

Certain aspects of the subject matter described here can be implemented as a method to plug a leak in a flowline. A location of a leak on a circumferential surface of a flowline is detected. The flowline includes a longitudinal axis. A chain-operated rotational positioning subassembly is attached to the circumferential surface of the flowline near the location of the leak. The rotational positioning subassembly carries an axial positioning subassembly that can move along the longitudinal axis. The axial positioning subassembly supports a plug insertion subassembly that supports a plug that can plug the leak in the flowline. A circumferential position of the rotational positioning subassembly is adjusted such that a location of the plug is axially in-line with the location of the leak on the circumferential surface of the flowline. An axial position of the axial positioning subassembly is adjusted such that the location of the plug is radially in-line with the location of the leak on the circumferential surface of the flowline. Using the plug insertion subassembly, the plug is moved into the leak in the flowline.

An aspect combinable with any other aspect includes the following features. The chain-operated rotational positioning subassembly includes a body. Multiple wheels are supported by the body. The wheels contact the circumferential surface of the flowline and can rotate to move the rotational positioning subassembly on the circumferential surface of the flowline. A chain is supported by the body. The chain can be wrapped around the flowline. The chain retains the chain-operated rotational positioning subassembly against the circumferential surface of the flowline. A control wheel is supported by the body. The control wheel is connected to the chain and to the wheels. A rotation of the control wheel causes a translation of the chain, which causes the wheels to rotate on the circumferential surface of the flowline. To attach the rotational positioning subassembly to the circumferential surface of the flowline near the location of the leak, the chain is wrapped around the flowline near the location of the leak.

An aspect combinable with any other aspect includes the following features. To adjust the circumferential position of the rotational positioning subassembly such that the location of the plug is axially in-line with the location of the leak on the circumferential surface of the flowline, the lock is placed in the unlocked position. The rotational positioning subassembly is moved on the circumferential surface of the flowline to position the plug to be axially in-line with the location of the leak. Upon determining that the plug is axially in-line with the location of the leak, the lock is placed in the locked position.

An aspect combinable with any other aspect includes the following features. The axial positioning subassembly includes two arms—a first arm and a second arm. The first arm includes a first end connected to the rotational positioning subassembly and a second end opposite the first end. The second arm includes a third end connected to the rotational positioning subassembly and a fourth end opposite the third end. A plate connects the second end of the first arm and the fourth end of the second arm. The axial positioning subassembly includes a first attachment sleeve supported by the first arm. A second attachment sleeve is supported by the second arm. The plug insertion subassembly is supported by and connected to the first attachment sleeve and the second attachment sleeve. The first attachment sleeve defines a hollow portion through which the first arm passes. The second attachment sleeve defines a hollow portion through which the second arm passes. The axial positioning subassembly includes a plate connecting the first attachment sleeve and the second attachment sleeve. The plug insertion subassembly is carried by the plate connecting the first attachment sleeve and the second attachment sleeve. To adjust the axial position of the axial positioning subassembly such that the location of the plug is radially in-line with the location of the leak on the circumferential surface of the flowline, the first attachment sleeve and the second attachment sleeve are moved on the first arm and the second arm, respectively, until the plug is radially in-line with the location of the leak.

An aspect combinable with any other aspect includes the following features. The plug insertion subassembly includes a plugger body attached to and resting on the plate connecting the first attachment sleeve and the second attachment sleeve. A thread shaft includes an end which is attached to the plugger body and which extends radially away from the flowline. A control wheel is attached to another end of the threaded shaft. The control wheel can be rotated to move the plug between the circumferential surface and the longitudinal axis of the flowline. To move the plug into the leak in the flowline using the plug insertion subassembly, the control wheel is rotated to cause the threaded shaft to move radially toward the longitudinal axis of the flowline until the plug is inserted into the leak.

Certain aspects of the subject matter described here can be implemented as an assembly that includes a chain-operated rotational positioning subassembly that can be wrapped around a flowline. The rotational positioning subassembly includes a body that includes an arcuate surface shaped to match a circumferential surface of the flowline. Multiple wheels are attached to the arcuate surface and directly contact the circumferential surface of the flowline. A chain is attached to the body. The chain can be wrapped around the flowline to retain the rotational positioning subassembly against the circumferential surface of the flowline. The assembly includes an axial positioning subassembly attached to the rotational positioning subassembly. The axial positioning subassembly can move along a longitudinal axis of the flowline. The axial positioning subassembly includes multiple arms. Each arm is attached to the body of the rotational positioning subassembly. Each arm extends along the circumferential surface of the flowline parallel to the longitudinal axis of the flowline. The axial positioning subassembly includes multiple sleeves. Each sleeve defines a hollow portion through which a respective arm passes. The sleeves can slide parallel to the longitudinal axis of the flowline on the arms. The axial positioning subassembly includes a plate connecting the multiple sleeves. The assembly includes plug insertion subassembly attached to the axial positioning subassembly. The plug insertion subassembly includes a plugger body attached to and resting on the plate of the axial positioning subassembly, a threaded shaft passing through the plugger body that includes a plug holder configured to hold a plug to plug a leak in the circumferential surface of the flowline, and a control wheel attached to the threaded shaft.

An aspect combinable with any other aspect includes the following features. The chain-operated rotational positioning subassembly includes a chain holder that includes a lock connected to the chain. When the lock is in a locked position, the chain holder is configured to lock a rotation of the rotational positioning subassembly on the circumferential surface of the flowline. When the lock is in an unlocked position, the chain holder is configured to permit free rotation of the rotational positioning subassembly on the circumferential surface of the flowline.

An aspect combinable with any other aspect includes the following features. The chain holder includes a spring that can be compressed when the lock is in the locked position and can be decompressed when the lock is in the unlocked position.

An aspect combinable with any other aspect includes the following features. The assembly includes a plug carried by the plug holder.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This disclosure describes it to the assembly to plug the leaks in pressurized flowlines, for example, flowlines that carry hydrocarbons or other fluids. The tool assembly can be positioned on and clamped to a flowline near the leak. The assembly has at least three components—a rotational positioning subassembly, and axial or longitudinal positioning subassembly, and a plug insertion subassembly. The rotational positioning subassembly allows changing the rotational position of the plug that will see the leak along a body of the flowline. The axial positioning subassembly allows changing the axial or longitudinal position of the plug along the body of the flowline. The plug insertion subassembly allows inserting the plug into the leak on the body of the flowline. By manually adjusting these three subassemblies, a plug can be inserted into the pipeline body to plug a leak.

The subject matter described here can be implemented to achieve one or more of the following advantages. Implementing the tool assembly adds an additional safety barrier precaution to the pinhole plugging process by reducing exposure of the tool assembly operator to hydrocarbons or other corrosive or harmful fluids being flowed through the pipeline. In some instances, an operator plugs a pinhole leak by manually inserting the plug into the pinhole leak without the assistance of any tools. Doing so increases the likelihood that the operator can be exposed to any fluids leaking out of the flowline. By using the tool assembly described here, the operator can insert the plug into the pinhole from a distance which minimizes the likelihood of the operator being exposed to the leaking fluid. Implementing the tool assembly can improve the pressure range for pinhole plugging procedures. The tool assembly allows the operator to plug leaks at greater pressures than the operator could plug without the use of tools. An amount of time required to seal a leak using the tool assembly described here is significantly lesser than manual techniques implemented without the tool assembly.

The tool assembly described in this disclosure can be attached to the flowline when the leak is identified. After the plug has been inserted, the tool assembly can be removed. In the context of this disclosure, the term "leak" or "pinhole leak" refers to a hole that forms on a circumferential surface of the flowline through which pressurized fluids being flowed through the flowline escape outside the flowline. The leak has an equivalent diameter of 6 inches or more. For example, the size of the leak hole can range from 0.5 inches to 1.5 inches, and the techniques described here can be implemented for pipes having diameter ranging from 6 inches to 56 inches. An upper limit of the leak size can depend on the size of a plug available to plug the leak. The upper limit can also depend on the size of a plug holder (described later) that can carry the plug.

Figure 1:
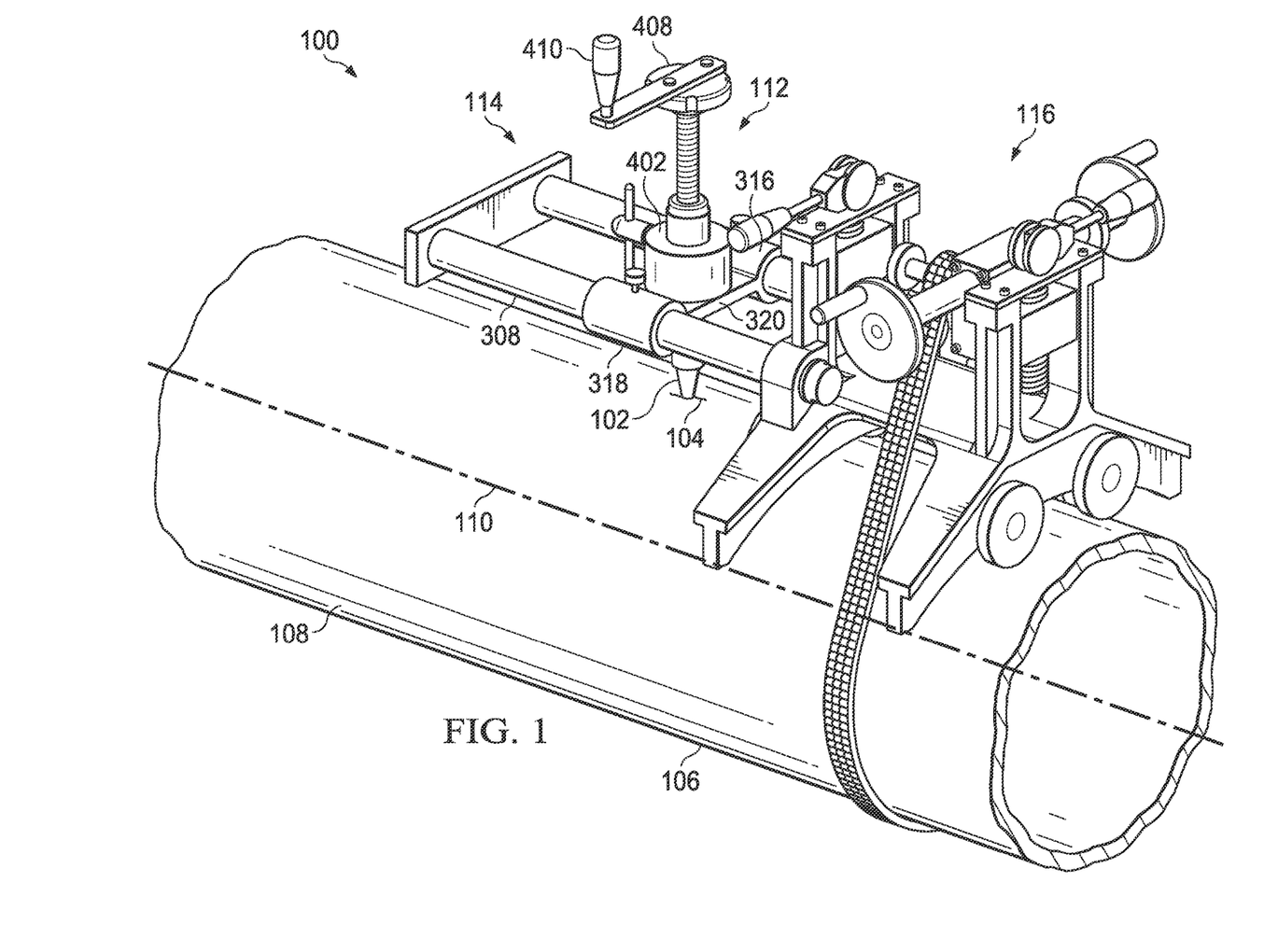
FIG. 1 is a schematic diagram of an assembly to plug pinhole leaks in flowlines.

FIG. 1 is a schematic diagram of a tool assembly 100 to plug pinhole leaks in flowlines. The assembly 100 includes a plug 102 that can plug the leak 104 in the flowline 106. The flowline 106 is a hollow, elongated, cylindrical tubular with a circular cross-section. The flowline 106 includes a circumferential surface 108 and a longitudinal axis 110 (FIG. 5) that passes through a center (i.e., the center of the circular cross-section) of the flowline 106. The assembly 100 includes a plug insertion subassembly 112 that supports the plug 102. By support, it is meant that the plug insertion subassembly 112 is configured to receive the plug 102 and to securely hold it in place during operation of the assembly 100. The plug insertion subassembly 112 can move the plug 102 between the circumferential surface 108 and the longitudinal axis 110 of the flowline 106. That is, the plug insertion subassembly 112 can move the plug 102 radially from an outer surface of the flowline 106 toward the center of the flowline 106 or in the opposite direction.

The assembly 100 includes an axial positioning subassembly 114 that supports the plug insertion subassembly 112. In some implementations, the axial positioning subassembly 114 is directly attached to, carries, and provides support to the components of the plug insertion subassembly 112. The axial positioning subassembly 114 can move the plug insertion subassembly 112 along the longitudinal axis 110 of the flowline 106. As described later, the components of the axial positioning subassembly 114 allowed the plug insertion subassembly 112 to move parallel to the circumferential surface 108 off the flowline 106. By doing so, the plug 102 carried by the plug insertion subassembly 112 can be axially or longitudinally aligned with the leak 104 on the circumferential surface 108 of the flowline 106.

The assembly 100 includes a chain-operated rotational positioning subassembly 116 that supports the axial positioning subassembly 114. In some implementations, the rotational positioning subassembly 116 is directly attached to, carries, and provides support to the components of the axial positioning subassembly 114. By doing so, the rotational positioning subassembly 116 indirectly carries and provide support to the components of the plug insertion subassembly 112. The rotational positioning subassembly 116 can be attached to the flowline 106, and is movable along the circumferential surface 108 of the flowline 106. As the rotational positioning subassembly 116 moves along the circumferential surface 108 of the flowline 106, the axial positioning subassembly 114 and the plug insertion assembly 112 also move along the circumferential surface 108. By doing so, the plug 102 carried by the plug insertion subassembly 112 can be radially aligned with the leak 104 on the circumferential surface 108 of the flowline 106.

Thus, an operator of the assembly 100 can both radially and axially align the plug 102 with the leak 104. Then, the operator can operate the plug insertion subassembly 112 to insert the plug 102 into the leak 104, thereby plugging the leak.

Figure 2:
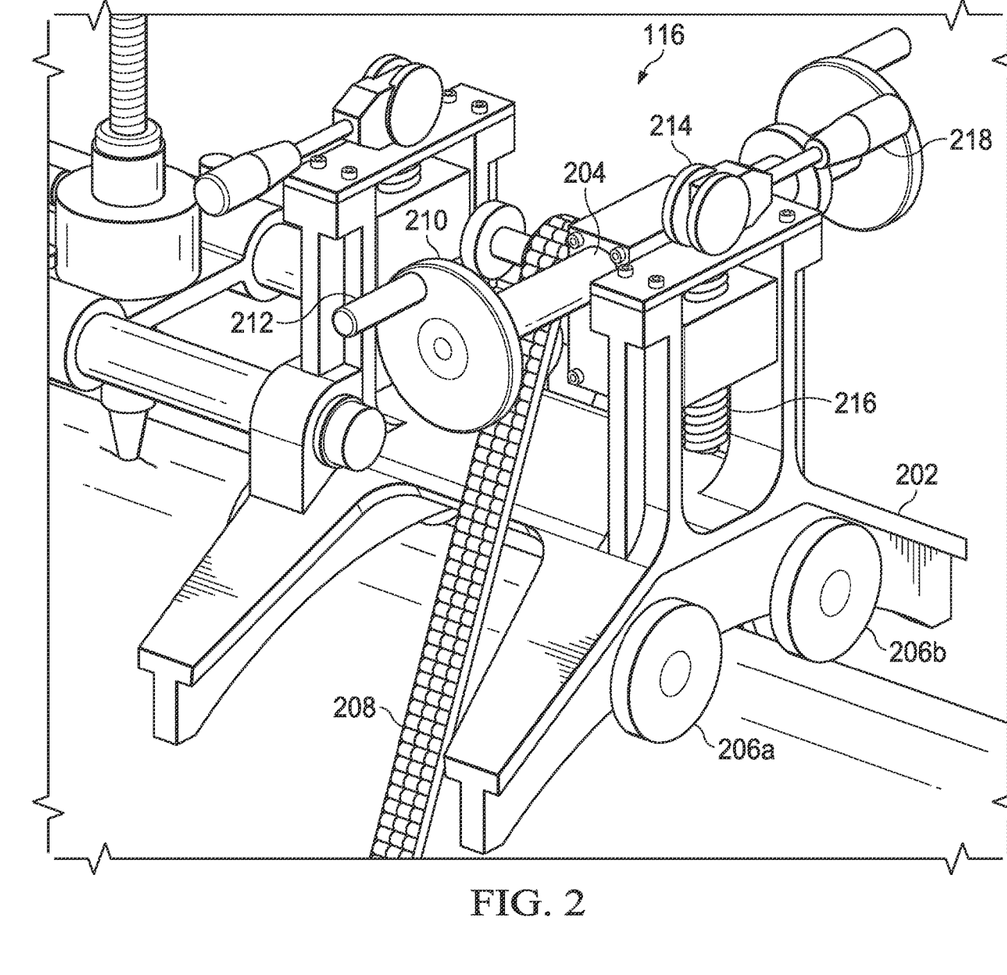
FIG. 2 is a schematic diagram of a rotational positioning subassembly of the assembly of FIG. 1.

FIG. 2 is a schematic diagram of the rotational positioning subassembly 116 of the assembly 100 of FIG. 1. In some implementations, the rotational positioning subassembly 116 includes a body 202. Remaining components of the rotational positioning subassembly 116 are mounted, for example, by direct or indirect attachment, to the body 202. In some implementations, the body 202 includes an arcuate surface 204, that is, a curved surface that is shaped to match the circumferential surface 108 of the flowline 106. For example, a curvature of the arcuate surface 204 of the body 202 can be substantially or identically equal to the curvature of the circumferential surface 108 of the flowline 106. Such curved shape of the body 202 allows the rotational positioning subassembly 116 to traverse the curved circumferential surface 108 of the flowline 106.

The rotational positioning subassembly 116 includes multiple wheels (for example, a first wheel 206a, a second wheel 206b, and additional wheels as needed). Each wheel is mounted, for example, directly or indirectly attached to the body 202 and contacts the circumferential surface 108 of the flowline 106. Each wheel can rotate to move the rotational positioning subassembly 116 on the circumferential surface 108 of the flowline 106. Specifically, the rotation of the multiple wheels causes the rotational positioning subassembly 116 to traverse a path that tracks the circumferential surface 108 of the flowline 106 and that this perpendicular to the longitudinal axis 110 of the flowline 106.

The rotational positioning subassembly 116 includes a chain 208 that is supported by the body 202. The chain 208 is long enough to be wrapped around the flowline 106 and around the rotational positioning subassembly 116, and can be tightened or loosened to lock or unlock the rotational positioning subassembly 116 against the circumferential surface 108 of the flowline 106. When the chain 208 is loosened, the rotational positioning subassembly 116 is unlocked to be moved along the circumferential surface 108 as described earlier. When the chain 208 is tightened, the rotational positioning subassembly 116 is locked and cannot be moved along the circumferential surface 108 as described earlier.

The rotational positioning subassembly 116 includes a control wheel 210 supported by the body 202. The control wheel 210 is connected to the chain 208 and to the multiple wheels. The control wheel 210 can be rotated to cause a translation of the chain 208, which causes the multiple wheels to rotate on the circumferential surface 108 of the flowline 106 as described earlier. In some implementations, the rotational positioning subassembly 116 includes a handle 212 attached to a surface of the control wheel 210. An operator of the assembly 100 can grip the handle 212 to rotate the control wheel 210. On the surface opposite to the surface on which the handle 212 is attached, the control wheel includes a shaft extending from that surface towards the body 202. When the chain 208 is loosened as described earlier, rotating the control wheel 210 using the handle 212 can cause the body 202 to traverse the circumferential surface 108 as described earlier.

The rotational positioning subassembly 116 includes a chain holder 214 that includes a lock connected to the chain 208. When the lock is in a locked position, the chain holder 214 can lock a rotation of the rotational positioning subassembly 116 on the circumferential surface 108 of the flowline 106. When locked, the control wheel 210 cannot be rotated or a rotation of the control wheel 210 cannot cause a movement of the rotational positioning subassembly 116 on the circumferential surface 108. When the lock is in an unlocked position, the chain holder 214 can permit free rotation of the rotational positioning subassembly 116 on the circumferential surface 108. In the unlocked position, the control wheel 210 can be rotated and a rotation of the control wheel causes the movement of the rotational positioning subassembly 116 on the circumferential surface 108 as described earlier.

In some implementations, the chain holder 214 is connected to the chain 208 by a spring 216 that can be compressed when the lock is in the locked position and decompressed when the lock is in the unlocked position. The chain holder 214 includes a handle 218 using which a level of compression or decompression of the spring 216 can be controlled. When the spring 216 is compressed, the chain 208 is tightened, and when it is decompressed, the chain 208 is loosened. A level of compression or decompression of the spring 216 and determines how tight or loose the chain 208 is. In turn, how tight or loose the chain 208 is determines how freely the rotational positioning subassembly 116 moves on the circumferential surface 108 of the flowline 106.

In operation, an operator places the rotational positioning subassembly 116 on the flowline 106, and then wraps the chain 208 around the flowline 106 and the rotational positioning subassembly 116. Then, the operator adjusts the chain holder 214 to adjust a compression or decompression level of the spring 216 to achieve a desired level of tightness of the chain 208. Then, the operator rotates the control wheel 210 to move the rotational positioning subassembly 116 to a desired location on the circumferential surface 108 of the flowline 106. Having reached the desired location, the chain holder 214 locks in place at that location.

Figure 3:
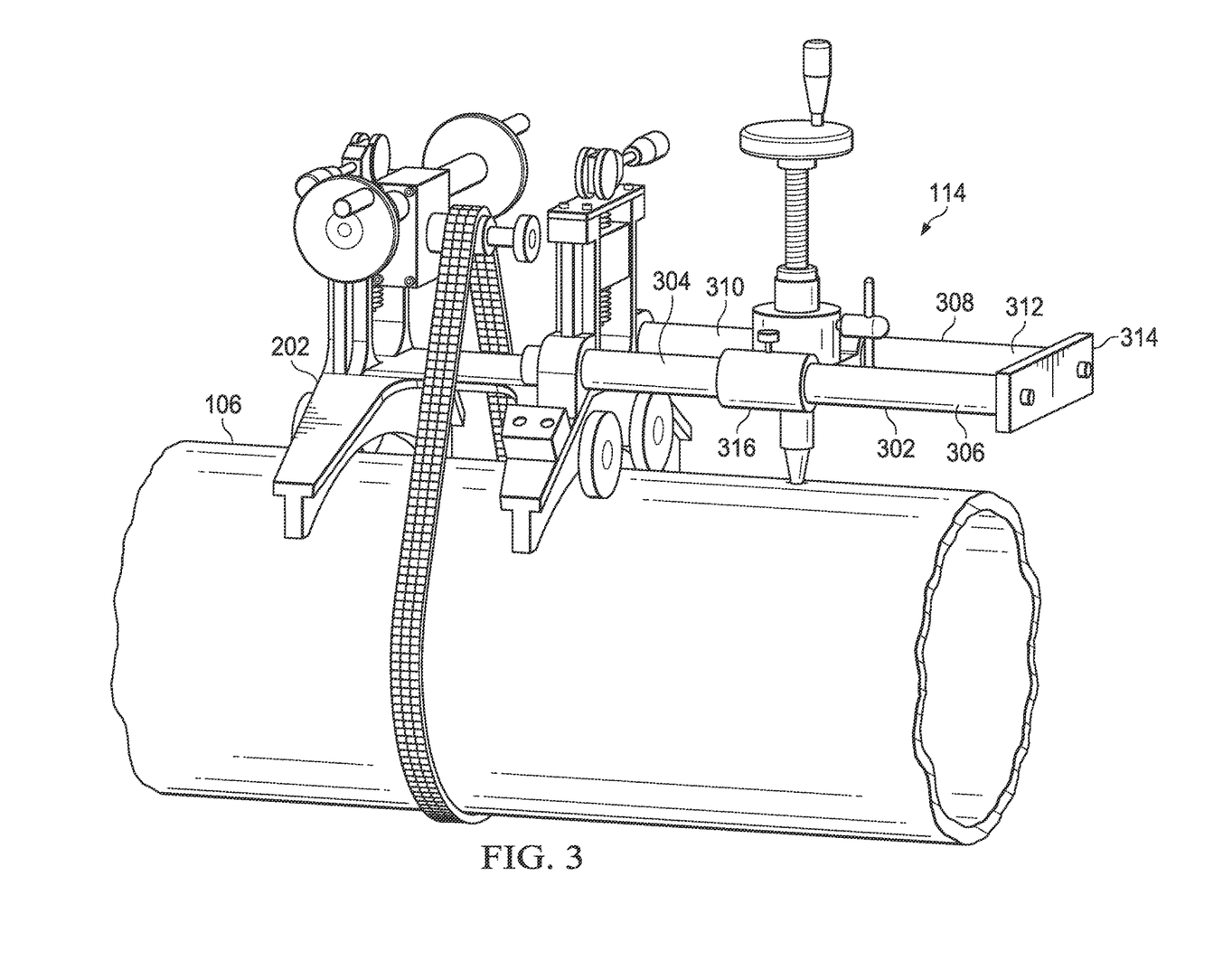
FIG. 3 is a schematic diagram of an axial positioning subassembly of the assembly of FIG. 1

FIG. 3 is a schematic diagram of the axial positioning subassembly 114 of the assembly 100 of FIG. 1. The axial positioning subassembly 114 includes a first arm 302 having a first end 304 connected to the rotational positioning assembly 112, for example, to the body 202, and a second end 306 opposite the first end. The axial positioning subassembly 114 also includes a second arm 308 having a third end 310 connected to the rotational positioning assembly 112, for example, to the body 202 and offset from the first and 304. The second arm 308 includes a fourth end 312. Each arm can be a solid cylindrical rod of any cross-section, for example, circular cross-section. The arms can be the same length. When the first and third ends of the first and second arms, respectively, are attached to the body 202, the arms can be parallel to the flowline 106, specifically to the longitudinal axis 110 of the flowline 106. The axial positioning subassembly 114 includes a plate 314 that is connected to the second end 306 and the fourth end 312. The ends of the two arms can be fastened to the plate using any fastener, for example, screws, rivets, nuts, and the like.

The axial positioning subassembly 114 includes a first attachment sleeve 316 supported by the first arm 302, and a second attachment sleeve 318 (FIG. 1) supported by the second arm 308. As described in more detail with reference to FIG. 4, the plug insertion subassembly 112 is supported by and connected to the first attachment sleeve 316 and the second attachment sleeve 318. In some implementations, each attachment sleeve defines a respective hollow portion through which a respective arm passes. The axial positioning subassembly 114 includes a plate 320 (FIG. 1) that connects the first attachment sleeve 316 and the second attachment sleeve 318. The plug insertion subassembly 114 is carried by and directly attached to the plate 320 that connects the two attachments leaves. The attachments leaves and the plate 320 can slide along the two arms towards or away from the body 202 of the rotational positioning subassembly 116. The attachment sleeves can be locked in place on the respective arms using suitable fasteners, for example, screws, nuts, and the like.

In operation, after locking the rotational positioning subassembly 116 in place, the operator loosens the fasteners that lock the attachment sleeves and the plate 322 the two arms. Then, the operator moves the plate and the plug insertion subassembly 112 longitudinally or axially either towards or away from the rotational positioning subassembly 116 until the plug insertion subassembly 112 is at a desired location. Because both arms are parallel to the circumferential surface 108 of the flowline 106, a travel path of the plug insertion subassembly 112 is also along the longitudinal axis 110 of the flowline 106, parallel to the circumferential surface 108. Having reached the desired location, the operator can lock the attachments leaves in place on the respective arms using the fasteners.

Figure 4:
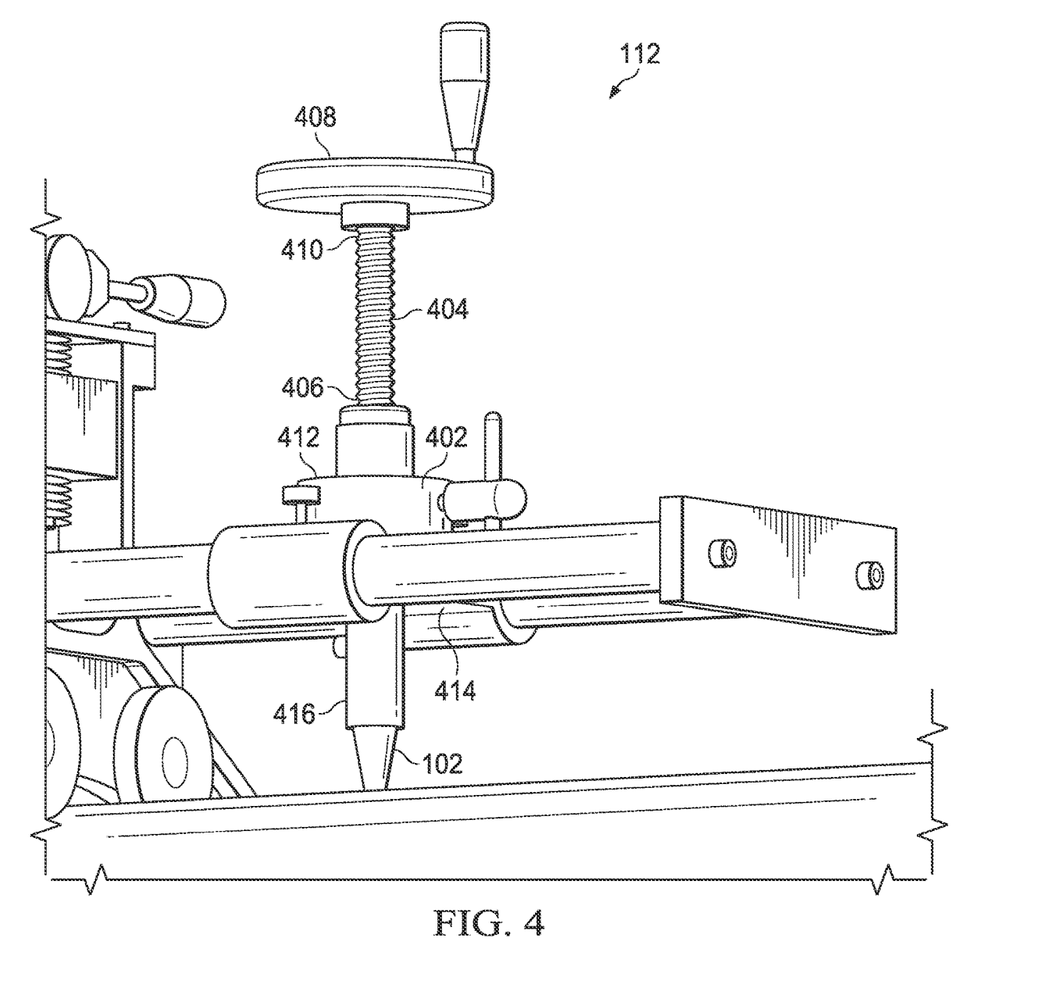
FIG. 4 is a schematic diagram of a plug insertion subassembly of the assembly of FIG. 1.

FIG. 4 is a schematic diagram of the plug insertion subassembly 112 of the assembly 100 of FIG. 1. The plug insertion subassembly 112 includes a plugger body 402, for example, a solid cylindrical block, that rests on the plate 320 connecting the first attachment sleeve 316 and the second attachment sleeve 318. The plug insertion subassembly 112 includes a threaded shaft 404 having an end 406 attached to the plugger body 402 and extending radially away from the flowline 106. A control wheel 408 is attached to the other end 410 of the threaded shaft 404. The control wheel 408 is rotatable to move the plug 102 between the circumferential surface 108 and the longitudinal axis 110 of the flowline 106. In some implementations, the threaded shaft 404 is attached to a first surface 412 of the plugger body 402. The plug 102 is attached to the plugger body 402 on a second surface 414 opposite the first surface 412. In some implementations, the plug insertion subassembly 112 includes a plug holder 416 that can hold the plug 102. That is, the plug holder 416 can receive and hold the plug 102 in a secure manner when the plug insertion subassembly 112 is operated to insert the plug into the leak 104 on the circumferential surface 108 of the flowline 106. The threaded shaft 404 passed through the plugger body 402 and the plate 320, and connect to the plug holder 416.

In some implementations, the threaded shaft 404 is connected perpendicular to the plate 320, which is parallel to the two arms of the axial positioning subassembly 114. Consequently, the threaded shaft 404 is perpendicular to the circumferential surface 108 and the longitudinal axis 110 of the flowline 106. Therefore, the plug 102 is inserted into the leak 104 perpendicular to the circumferential surface 108.

In operation, after locking the attachments of the axial positioning subassembly 114 in place on the respective arms, the user rotates the control wheel 408 to turn the threaded shaft 404. In some implementations, the control wheel 408 is attached to a handle 410 which the operator can grip to turn the threaded shaft 404. For example, by turning the control wheel 408 in a clockwise direction, the operator can cause the plug insertion subassembly 112 to move the plug 102 radially towards the longitudinal axis 110 of the flowline 106. Conversely, by turning the control wheel 408 in a counterclockwise direction, the operator can cause the plug insertion subassembly 112 to move the plug 102 radially away from the longitudinal axis 110 of the flowline 106.

Figure 5:
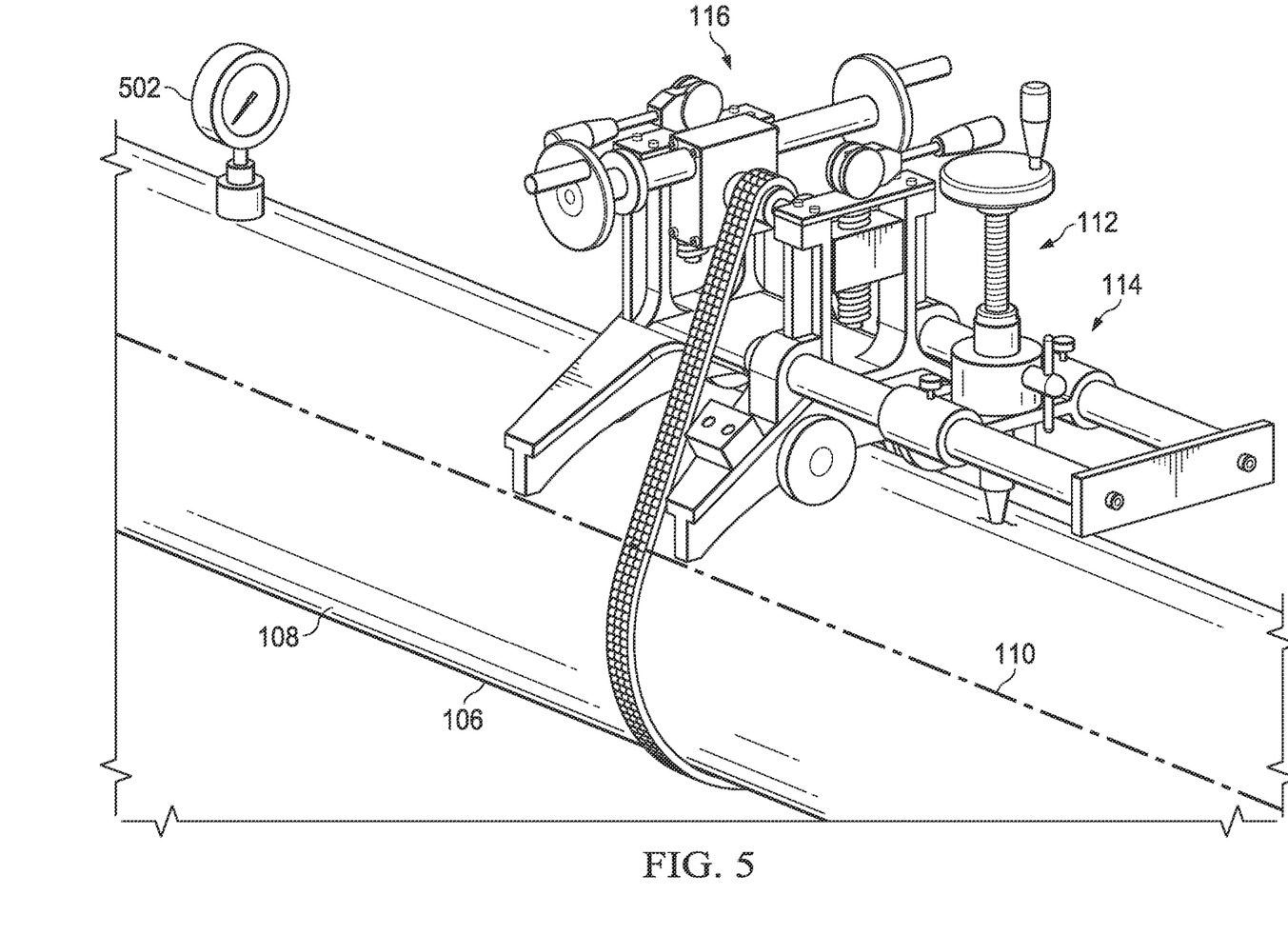
FIG. 5 is a schematic diagram showing the assembly of FIG. 1 in use.

FIG. 5 is a schematic diagram showing the assembly 100 of FIG. 1 in use. The operator detects the leak 104 on the circumference 108 of the flowline 106. For example, a pressure gauge 502 (or other pressure measurement system) can be fluidically coupled to the inner volume of the flowline 106 to measure a pressure within the flowline 106. When the leak 104 forms in the flowline 106, the pressure gauge 502 detects a drop in the pressure, which indicates the presence of the leak 104. Alternatively or in addition, the operator can detect the leak 104 visually, that is, based on seeing the fluids leaking out of the flowline 106 through the leak 104. In response, the operator shuts down area operations down the flowline 106 and begins the depressurization. During depressurization, the operator mobilizes the tool assembly 100 to the location of the leak 104. For safety and protection, the operator is equipped with personal protection equipment.

The operator secures the rotational positioning subassembly 116 to the circumferential surface 108 near a location of the leak 104. Then, the operator adjusts a circumferential position of the rotational positioning subassembly 116 on the circumferential surface 108. Then, the operator adjusts a position of the axial positioning subassembly 114, specifically of the attachment sleeves on the arms of the axial positioning subassembly 114. The operator continues to adjust the positions of the rotational positioning subassembly 116 and the axial positioning subassembly 114 until the plug 102 is directly above the leak 104. That is, in the final position of the tool assembly 100, a longitudinal axis of the threaded shaft of the plug insertion subassembly 112, and the plug 102 will be co-linear with a radius of the flowline 106 passing through the leak 104. Then, the operator waits until the pressure within the flowline 106 drops below a threshold pressure. Then, the operator rotates the control wheel of the plug insertion subassembly 112 to move the plug 102 towards the leak 104. The operator continues operating the control wheel of the plug insertion subassembly 112 until the plug 102 is inserted into the leak 104, where the plug 102 will be threaded into and to see the leak 104.

Figure 6:
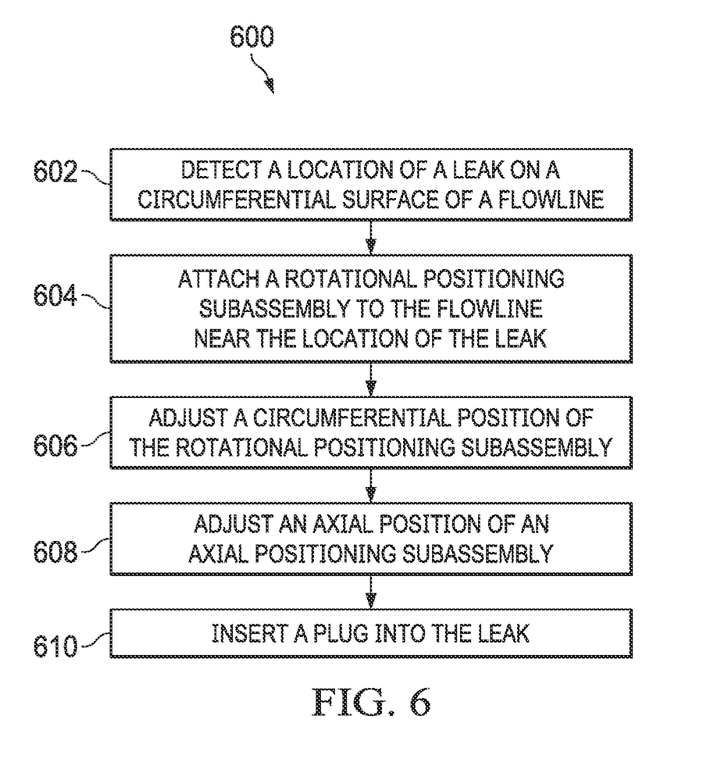
FIG. 6 is a flowchart of an example of a method of using the assembly of FIG. 1.

FIG. 6 is a flowchart of an example of a method 600 of using the assembly of FIG. 1. The method 600 can be implemented by an operator of the tool assembly 100 described earlier. At 602, the operator detects a location of a leak on a circumferential surface of the flowline, for example, the flowline 106. At 604, the operator attaches a chain-operated rotational positioning subassembly, for example, the subassembly 116, to the circumferential surface of the flowline near the location of the leak. At 606, the operator adjusts a circumferential position of the rotational positioning subassembly 116. At 608, the operator adjusts an axial position of an axial positioning subassembly, for example, the axial positioning subassembly 114. At this point, a plug to be inserted into the leak is directly above the leak. At 610, by operating a plug insertion subassembly for example, the plug insertion subassembly 112, the operator inserts the plug into the leak.

Thus, particular implementations of the subject matter have been described. Other implementations are within the scope of the following claims.

The invention claimed is:

1. An assembly to plug a leak in a flowline, the assembly comprising:
   a plug configured to plug the leak in the flowline comprising a circumferential surface and a longitudinal axis;
   a plug insertion subassembly supporting the plug, the plug insertion subassembly configured to move the plug between the circumferential surface and the longitudinal axis of the flowline;
   an axial positioning subassembly supporting the plug insertion subassembly, the axial positioning subassembly configured to move the plug insertion subassembly along the longitudinal axis of the flowline, wherein the axial positioning subassembly comprises:

a first arm comprising a first end connected to the rotational positioning subassembly and a second end opposite the first end;
a second arm comprising a third end connected to the rotational positioning subassembly and a fourth end opposite the third end; and
a plate connected to the second end of the first arm and the fourth end of the second arm; and
a chain-operated rotational positioning subassembly supporting the axial positioning subassembly, the rotational positioning subassembly configured to be attached to the flowline with the leak, the rotational positioning subassembly movable and configured to move the axial positioning subassembly on the circumferential surface of the flowline.

2. The assembly of claim 1, wherein the chain-operated rotational positioning subassembly comprises:
a body;
a plurality of wheels supported by the body, the plurality of wheels contacting the circumferential surface of the flowline and configured to rotate to move the rotational positioning subassembly on the circumferential surface of the flowline;
a chain supported by the body, the chain configured to be wrapped around the flowline, the chain retaining the chain-operated rotational positioning subassembly against the circumferential surface of the flowline; and
a control wheel supported by the body, the control wheel connected to the chain and to the plurality of wheels, wherein a rotation of the control wheel causes a translation of the chain, which causes the plurality of wheels to rotate on the circumferential surface of the flowline.

3. The assembly of claim 2, wherein the chain-operated rotational positioning subassembly further comprises a chain holder comprising a lock connected to the chain, wherein when the lock is in a locked position, the chain holder is configured to lock a rotation of the rotational positioning subassembly on the circumferential surface of the flowline, and when the lock is in an unlocked position, the chain holder is configured to permit free rotation of the rotational positioning subassembly on the circumferential surface of the flowline.

4. The assembly of claim 3, wherein the chain holder comprises a spring configured to be compressed when the lock is in the locked position and to be decompressed when the lock is in the unlocked position.

5. The assembly of claim 2, wherein the control wheel of the rotational positioning subassembly comprises a handle attached to a circumference of the control wheel.

6. The assembly of claim 1, wherein the axial positioning subassembly comprises:
a first attachment sleeve supported by the first arm; and
a second attachment sleeve supported by the second arm, wherein the plug insertion subassembly is supported by and connected to the first attachment sleeve and the second attachment sleeve.

7. The assembly of claim 6, wherein the first attachment sleeve defines a hollow portion through which the first arm passes, wherein the second attachment sleeve defines a hollow portion through which the second arm passes, wherein the axial positioning subassembly comprises a plate connecting the first attachment sleeve and the second attachment sleeve, wherein the plug insertion subassembly is carried by the plate connecting the first attachment sleeve and the second attachment sleeve.

8. The assembly of claim 6, wherein the plug insertion subassembly comprises:
a plugger body attached to and resting on the plate connecting the first attachment sleeve and the second attachment sleeve;
a threaded shaft comprising an end attached to the plugger body and extending radially away from the flowline; and
a control wheel attached to another end of the threaded shaft, the control wheel rotatable to move the plug between the circumferential surface and the longitudinal axis of the flowline.

9. The assembly of claim 8, wherein the threaded shaft is attached to a first surface of the plugger body, wherein the plug is attached to the plugger body on a second surface opposite the first surface.

10. A method to plug a leak in a flowline, the method comprising:
detecting a location of a leak on a circumferential surface of a flowline comprising a longitudinal axis;
attaching a chain-operated rotational positioning subassembly to the circumferential surface of the flowline near the location of the leak, wherein the rotational positioning subassembly carries an axial positioning subassembly that can move along the longitudinal axis, wherein the axial positioning subassembly supports a plug insertion subassembly that supports a plug that is configured to plug the leak in the flowline;
adjusting a circumferential position of the rotational positioning subassembly such that a location of the plug is axially in-line with the location of the leak on the circumferential surface of the flowline;
adjusting an axial position of the axial positioning subassembly such that the location of the plug is radially in-line with the location of the leak on the circumferential surface of the flowline; and
moving, using the plug insertion subassembly, the plug into the leak in the flowline.

11. The method of claim 10, wherein the chain-operated rotational positioning subassembly comprises:
a body,
a plurality of wheels supported by the body, the plurality of wheels contacting the circumferential surface of the flowline and configured to rotate to move the rotational positioning subassembly on the circumferential surface of the flowline,
a chain supported by the body and wrapped around the flowline, the chain retaining the chain-operated rotational positioning subassembly against the circumferential surface of the flowline,
a control wheel supported by the body, the control wheel connected to the chain and to the plurality of wheels, wherein a rotation of the control wheel causes a translation of the chain, which causes the plurality of wheels to rotate on the circumferential surface of the flowline,
a chain holder comprising a lock connected to the chain, wherein when the lock is in a locked position, the chain holder is configured to lock a rotation of the rotational positioning subassembly on the circumferential surface of the flowline, and when the lock is in an unlocked position, the chain holder is configured to permit free rotation of the rotational positioning subassembly on the circumferential surface of the flowline
wherein attaching the rotational positioning subassembly to the circumferential surface of the flowline near the location of the leak comprises wrapping the chain around the flowline near the location of the leak.

12. The method of claim 11, wherein adjusting the circumferential position of the rotational positioning subassembly such that the location of the plug is axially in-line with the location of the leak on the circumferential surface of the flowline comprises:
 placing the lock in the unlocked position;
 moving the rotational positioning subassembly on the circumferential surface of the flowline to position the plug to be axially in-line with the location of the leak; and
 upon determining that the plug is axially in-line with the location of the leak, placing the lock in the locked position.

13. The method of claim 12, wherein the axial positioning subassembly comprises:
 a first arm comprising a first end connected to the rotational positioning subassembly and a second end opposite the first end,
 a second arm comprising a third end connected to the rotational positioning subassembly and a fourth end opposite the third end,
 a plate connected to the second end of the first arm and the fourth end of the second arm,
 a first attachment sleeve supported by the first arm, and
 a second attachment sleeve supported by the second arm, wherein the plug insertion subassembly is supported by and connected to the first attachment sleeve and the second attachment sleeve, wherein the first attachment sleeve defines a hollow portion through which the first arm passes, wherein the second attachment sleeve defines a hollow portion through which the second arm passes, wherein the axial positioning subassembly comprises a plate connecting the first attachment sleeve and the second attachment sleeve, wherein the plug insertion subassembly is carried by the plate connecting the first attachment sleeve and the second attachment sleeve,
 wherein adjusting the axial position of the axial positioning subassembly such that the location of the plug is radially in-line with the location of the leak on the circumferential surface of the flowline comprises:
  moving the first attachment sleeve and the second attachment sleeve on the first arm and the second arm, respectively, until the plug is radially-in line with the location of the leak.

14. The method of claim 13, wherein the plug insertion subassembly comprises:
 a plugger body attached to and resting on the plate connecting the first attachment sleeve and the second attachment sleeve,
 a threaded shaft comprising an end attached to the plugger body and extending radially away from the flowline, and
 a control wheel attached to another end of the threaded shaft, the control wheel rotatable to move the plug between the circumferential surface and the longitudinal axis of the flowline,
 wherein moving, using the plug insertion subassembly, the plug into the leak in the flowline comprises rotating the control wheel to cause the threaded shaft to move radially toward the longitudinal axis of the flowline until the plug is inserted into the leak.

15. An assembly comprising:
 a chain-operated rotational positioning subassembly configured to be wrapped around a flowline, the rotational positioning subassembly comprising:
  a body comprising an arcuate surface shaped to match a circumferential surface of the flowline,
  a plurality of wheels attached to the arcuate surface and directly contacting the circumferential surface of the flowline, and
  a chain attached to the body, the chain configured to be wrapped around the flowline to retain the rotational positioning subassembly against the circumferential surface of the flowline;
  a control wheel supported by the body, the control wheel connected to the chain and to the plurality of wheels, wherein a rotation of the control wheel causes a translation of the chain which causes the plurality of wheels to rotate on the circumferential surface of the flowline, wherein the chain-operated rotational positioning subassembly further comprises a chain holder comprising a lock connected to the chain, wherein when the lock is in a locked position, the chain holder is configured to lock a rotation of the rotational positioning subassembly on the circumferential surface of the flowline, and when the lock is in an unlocked position, the chain holder is configured to permit free rotation of the rotational positioning subassembly on the circumferential surface of the flowline;
 an axial positioning subassembly attached to the rotational positioning subassembly, the axial positioning subassembly configured to move along a longitudinal axis of the flowline, the axial positioning subassembly comprising:
  a plurality of arms, each arm attached to the body of the rotational positioning subassembly, each arm extending along the circumferential surface of the flowline parallel to the longitudinal axis of the flowline,
  a plurality of sleeves, each defining a hollow portion through which a respective arm of the plurality of arms passes, wherein the plurality of sleeves are configured to slide parallel to the longitudinal axis of the flowline on the plurality of arms, and
  a plate connecting the plurality of sleeves; and
 a plug insertion subassembly attached to the axial positioning subassembly, the plug insertion subassembly comprising:
  a plugger body attached to and resting on the plate of the axial positioning subassembly,
  a threaded shaft passing through the plugger body and comprising a plug holder configured to hold a plug to plug a leak in the circumferential surface of the flowline, and
  a control wheel attached to the threaded shaft.

16. The assembly of claim 15, wherein the chain holder comprises a spring configured to be compressed when the lock is in the locked position and to be decompressed when the lock is in the unlocked position.

17. The assembly of claim 15, further comprising a plug carried by the plug holder.

\* \* \* \* \*